United States Patent [19]

Kakizaki et al.

[11] Patent Number: 4,984,819
[45] Date of Patent: Jan. 15, 1991

[54] AUTOMOTIVE SUSPENSION SYSTEM AND SHOCK ABSORBER THEREFOR

[75] Inventors: Shinobu Kakizaki; Fumiyuki Yamaoka; Shigeru Kikushima; Junichi Emura, all of Kanagawa, Japan

[73] Assignee: Atsugi Motor Parts Company, Limited, Kanagawa, Japan

[21] Appl. No.: 337,349

[22] Filed: Apr. 13, 1989

[30] Foreign Application Priority Data

Apr. 14, 1988 [JP] Japan ................................ 63-92800
Apr. 15, 1988 [JP] Japan ................................ 63-93099
Apr. 15, 1988 [JP] Japan ................................ 63-50768[U]
Apr. 15, 1988 [JP] Japan ................................ 63-50770[U]
Apr. 19, 1988 [JP] Japan ................................ 63-53299[U]
Apr. 19, 1988 [JP] Japan ................................ 63-53300[U]
Aug. 31, 1988 [JP] Japan ................................ 63-115452[U]
Nov. 18, 1988 [JP] Japan ................................ 63-150592[U]

[51] Int. Cl.$^5$ ...................... B60G 17/00; B60G 17/08
[52] U.S. Cl. .................................. 280/707; 280/702; 280/714; 188/299
[58] Field of Search .................. 267/225, 64.15, 64.25, 267/35, 64.16; 280/701, 702, 709, 711, 714, 707; 188/299, 298

[56] References Cited

U.S. PATENT DOCUMENTS

| 4,635,906 | 1/1987 | Buma | 188/299 |
| 4,650,042 | 3/1987 | Knecht et al. | 188/299 |
| 4,729,459 | 3/1988 | Inagaki et al. | 188/299 |
| 4,768,758 | 9/1988 | Buma | 280/707 |
| 4,773,671 | 9/1988 | Inagaki | 280/707 |
| 4,790,522 | 12/1988 | Drutchas | 280/707 |

Primary Examiner—Richard A. Bertsch
Attorney, Agent, or Firm—Bachman & LaPointe

[57] ABSTRACT

An automotive suspension system employs a pressure sensor means designed for monitoring fluid pressure in a fluid chamber of shock absorber to be compressed during piston bounding stroke. Variable suspension characteristics to vary suspension mode between HARD mode and SOFT mode so that suspension mode is normally set in SOFT mode and switched into HARD mode when variation rate of the output of the sensor means becomes greater than a predetermined rate and when the output of the sensor means represents a pressure higher than a predetermined level in the piston bounding stroke.

30 Claims, 11 Drawing Sheets

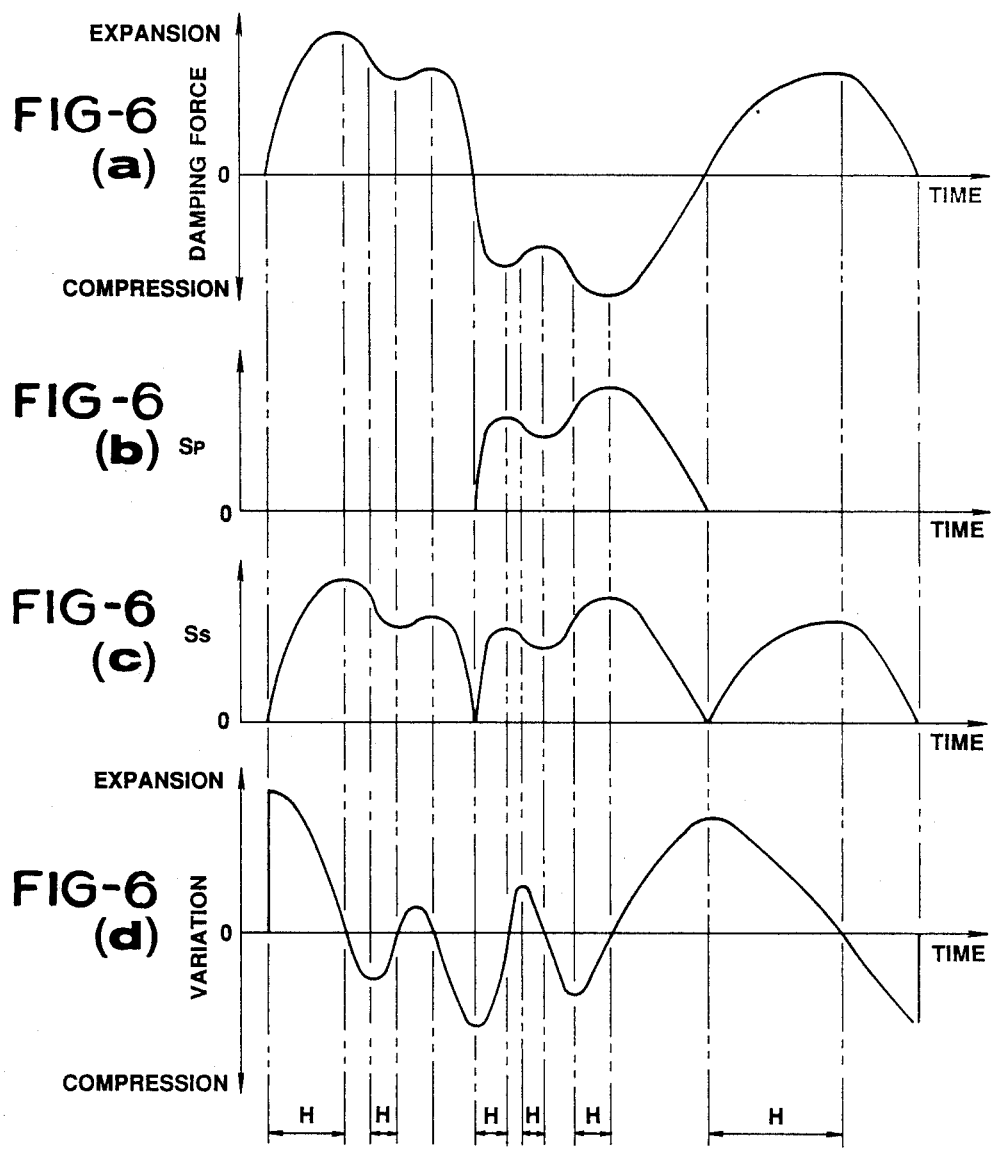

AUTOMOTIVE SUSPENSION SYSTEM AND SHOCK ABSORBER THEREFOR

BACKGROUND OF THE INVENTION

1. Field of the Invention

The present invention relates generally to a suspension system for an automotive vehicle, which is variable of suspension characteristics with high response characteristics. More specifically, the invention relates to an automotive suspension system which is variable of damping characteristics per every vibration cycles. The invention further relates to a variable damping shock absorber which is applicable for the automotive suspension system.

2. Description of the Background Art

In the recent automotive technologies, respective automotive components have been required high performance and high response. In case of a suspension system, it has been required high level of riding comfort and driving stability. In order to achieve both of high level riding comfort and high level driving stability, high response against vibration input to the suspension system has been required.

One of the typical variable damping force suspension system has been disclosed in Japanese Patent First (unexamined) Publication (Tokkai) Showa No. 61-85210. In the disclosed system, a piezoelectric element is disposed in each shock absorber in each suspension system for detecting variation of fluid pressure in the shock absorber. A control unit is provided for receiving an input indicative of the fluid pressure provided from the piezoelectric element. The control unit outputs a controlled voltage to the piezoelectric element for switching operation mode of the shock absorber at least between SOFT mode in which smaller damping force is to be generated in response to vibration input and HARD mode in which greater damping force is to be generated in response to vibration input.

In general, the control unit is responsive to low frequency input vibration which induces attitude change of the vehicle body to switch the operational mode of the shock absorber into HARD mode for a given period of time. While the shock absorber is maintained at the HARD mode, the piezoelectric element maintains operation as an actuator for maintaining HARD mode operation of the shock absorber. Therefore, while it is active as the actuator, the piezoelectric element can not monitor fluid pressure.

In the modern technology of suspension control, it has been considered that varying of damping characteristics of shock absorber between a piston compression stroke in response to bounding motion between the vehicle body and a road wheel and a piston expansion stroke in response to rebounding motion between the vehicle body and the road wheel in order to obtain better vibration stabilizing performance. Therefore, it is desirable to adjust the damping characteristics of the shock absorber depending upon the mode of piston action. In order to realize this, it is essential to detect the piston action mode on the basis of variation of the fluid pressure in the shock absorber. However, as set forth above, since the piezoelectric element is held in operative as the fluid pressure sensing element while the shock absorber is maintained at the HARD mode.

This may cause problem in damping shocks. For example, when the damping characteristics in the HARD mode is set to generate relatively great damping force in response to vibration input, damping force generated in response to piston compression mode action can amplify the input vibration. This tendency may be significant for the second and subsequent vibration cycles. This clearly degrades vibration stabilizing performance of the vehicle to provide rough ride feeling.

In addition, in the prior proposed suspension system operates substantially in passive manner to detect the input vibration based on variation of fluid pressure in the shock absorber. Namely, until the vehicle driving condition is changed to require switching of suspension characteristics, the suspension system will never operate to switch suspension characteristics. Therefore, when a criterion of the fluid pressure to switch the suspension mode from SOFT mode to HARD mode is set at relatively high value in order to provide better riding comfort, switch from SOFT mode to HARD mode tends to delay to cause bottoming due to low response characteristics particularly at the initial stage of switching of suspension mode.

SUMMARY OF THE INVENTION

Therefore, it is an object of the present invention to provide a suspension system for an automotive vehicle, which can provide variable suspension characteristics according to a vehicle driving condition with high precision level and high response level.

Another object of the present invention is to provide a variable damping force shock absorber for use in the suspension system of the invention.

In order to accomplish the aforementioned and objects, an automotive suspension system, according to the present invention, employs a pressure sensor means designed for monitoring fluid pressure in a fluid chamber of shock absorber to be compressed during piston bounding stroke. Variable suspension characteristics to vary suspension mode between HARD mode and SOFT mode so that suspension mode is normally set in SOFT mode and switched into HARD mode when variation rate of the output of the sensor means becomes greater than a predetermined rate and when the output of the sensor means represents a pressure higher than a predetermined level in the piston bounding stroke.

According to one aspect of the invention, an automotive suspension system comprises:

a shock absorber disposed between a vehicle body and a suspension member rotatably supporting a road wheel, the shock absorber including a cylinder tube connected to one of the vehicle body and the suspension member and defining an internal space, a piston disposed within the internal space for dividing the internal space into first and second chambers and connected to the other of the vehicle body and the suspension member for relative movement with respect to the cylinder tube, the first and second chambers being filled with a working fluid;

a fluid communication means for establishing fluid communication between the first and second chambers with a limited fluid flow rate for generating a damping force against relative motion between the piston and the cylinder tube;

a valve means associated with the fluid communication means for controlling flow restriction of the fluid communication means, the valve means being variable of flow restriction characteristics for varying damping characteristics of the shock absorber;

a sensor means for monitoring fluid pressure in the first chamber for producing a piston stroke indicative signal indicative of magnitude of piston stroke;

an actuating means, associated with the valve means and responsive to a control signal, for controlling the valve means for adjusting flow restriction characteristics according the control signal; and a controlling means, receiving the piston stroke indicative signal, for deriving a piston stroke speed representative data on the basis of the piston stroke indicative signal and detecting the piston stroke speed reaching a peak value for producing the control signal for harder damping characteristics and detecting alternation of piston stroke direction for producing the control signal for softer damping characteristics.

According to another aspect of the invention, an automotive suspension system comprises:

a shock absorber disposed between a vehicle body and a suspension member rotatably supporting a road wheel, the shock absorber including a cylinder tube connected to one of the vehicle body and the suspension member and defining an internal space, a piston disposed within the internal space for dividing the internal space into first and second chambers and connected to the other of the vehicle body and the suspension member for relative movement with respect to the cylinder tube, the first and second chambers being filled with a working fluid;

a fluid communication means for establishing fluid communication between the first and second chambers with a limited fluid flow rate for generating a damping force against relative motion between the piston and the cylinder tube;

a valve means associated with the fluid communication means for controlling flow restriction of the fluid communication means, the valve means being variable of flow restriction characteristics for varying damping characteristics of the shock absorber;

a pressure sensor means for monitoring fluid pressure in the fluid pressure in the first chamber for producing a pressure indicative signal indicative of magnitude fluid pressure level higher than a predetermined initial pressure level;

an actuating means, associated with the valve means and responsive to a control signal, for controlling the valve means for adjusting flow restriction characteristics according the control signal; and a controlling means, receiving the pressure indicative signal, for deriving a variation rate of the pressure indicative signal and detecting the variation rate reaching a peak value for producing the control signal for increasing flow restriction for harder damping characteristics and detecting the variation rate decreasing across a predetermined softer suspension criterion for producing the control signal for decreasing flow restriction for softer damping characteristics.

In the preferred construction, the pressure comprises a first piezoelectric element and the actuating means comprises a second piezoelectric element. Also, the controlling means may increase the control signal value at a predetermined rate for increasing flow restriction at a predetermined rate and/or decrease the control signal value at a predetermined rate for decreasing flow restriction at a predetermined rate. Furthermore, the controlling means derives flow restriction to be represented by the control signal on the basis of a peak value of the variation rate of the pressure indicative signal. The controlling means may further compare the variation rate with a predetermined bottoming criterion for increasing flow restriction when the variation rate is greater than or equal to the bottoming criterion.

According to a further aspect of the invention, a automotive suspension system comprises:

a shock absorber disposed between a vehicle body and a suspension member rotatably supporting a road wheel, the shock absorber including a cylinder tube connected to one of the vehicle body and the suspension member and defining an internal space, a piston disposed within the internal space for dividing the internal space into first and second chambers and connected to the other of the vehicle body and the suspension member for relative movement with respect to the cylinder tube, the first and second chambers being filled with a working fluid;

a fluid communication means for establishing fluid communication between the first and second chambers with a limited fluid flow rate for generating a damping force against relative motion between the piston and the cylinder tube;

a first valve means associated with the fluid communication means for controlling flow restriction of the fluid communication means in a first direction of piston stroke, the valve means being variable of flow restriction characteristics for varying damping characteristics of the shock absorber;

a second valve means associated with the fluid communication means for controlling flow restriction of the fluid communication means in a second direction of piston stroke opposite to the first piston stroke direction, the valve means being variable of flow restriction characteristics for varying damping characteristics of the shock absorber;

a first piezoelectric means for monitoring fluid pressure in the fluid pressure in the first chamber during the second direction of piston stroke and producing a first pressure indicative signal indicative of magnitude fluid pressure level, the first piezoelectric element being responsive to a control signal for adjusting the flow restriction during the first direction of piston stroke;

a second piezoelectric means for monitoring fluid pressure in the fluid pressure in the second chamber during the first direction of piston stroke and producing a second pressure indicative signal indicative of magnitude fluid pressure level, the second piezoelectric element being responsive to the control signal for adjusting the flow restriction during the second direction of piston stroke; and a controlling means, receiving the first and second pressure indicative signal, for selecting one of the first and second pressure indicative signal depending upon the piston stroke direction for deriving a variation rate of the selected one of first and second pressure indicative signals, and detecting the variation rate reaching a peak value for producing the control signal for harder damping characteristics and detecting the variation rate decreasing across a predetermined second value for producing the control signal for softer damping characteristics.

Preferably, the controlling means has a first control channel connected to the first and second piezoelectric means for receiving the first pressure indicative signal from the first piezoelectric means and outputting the control signal to the second piezoelectric means during the first direction of piston stroke; and a second control channel connected to the first and second piezoelectric means for receiving the second pressure indicative signal from the second piezoelectric means and outputting the control signal to the first piezoelectric means in the second direction of piston stroke. The first piezoelectric means operates in a sensor mode during the second direction of piston stroke for monitoring fluid pressure in the first chamber and in an actuator mode for controlling the second valve means so as to adjust flow restriction during the first direction of piston stroke, and the second piezoelectric means operates in a sensor mode during the first direction of piston stroke for monitoring fluid pressure in the second chamber and in an actuator mode for controlling the second valve means so as to adjust flow restriction during the second direction of piston stroke. Each of the first and second piezoelectric means may comprise a plurality of thin plate members made of piezoelectric material and adapted to cause mechanical distortion in response to the control signal in a magnitude corresponding to the voltage of the control signal.

The controlling means may vary the control signal level between a first higher level ordering a predetermined harder damping characteristics and a second lower level ordering a predetermined softer damping characteristics. The controlling means varies the control signal level between the first higher and second lower levels at a predetermined variation rate for linearly varying damping characteristics between the predetermined harder and softer damping characteristics through a given lag period.

In the preferred construction, the piston strokes in the first direction in response to a vibration causing relative displacement of the vehicle body and the suspension member in bounding direction and in the second direction in response to a vibration causing relative displacement of the vehicle body and the suspension member in rebounding direction, and the controlling means detects the piston stroke in the first direction to compare the second pressure indicative signal with a predetermined pressure threshold and to compare the variation rate with a predetermined bottoming criterion for outputting the control signal for harder damping characteristics when the second pressure indicative signal is greater than or equal to the pressure threshold and the variation rate is greater than or equal to the bottoming criterion. In the alternative, the controlling means detects the piston stroke in the first direction to compare the variation rate with a predetermined first bottoming criterion for outputting the control signal for harder damping characteristics when the variation rate is greater than or equal to the first bottoming criterion, and detects the piston stroke in the second direction for to compare the variation rate with a predetermined second bottoming criterion for outputting the control signal for harder damping characteristics when the variation rate is greater than or equal to the second bottoming criterion. The controlling means may vary the voltage level of the control signal corresponding to the peak value of the variation rate.

According to a further aspect of the invention, a variable damping force shock absorber system for an automotive suspension system, comprises:

a cylinder tube connected to one of a vehicle body and a suspension member rotatably supporting a road wheel and defining an internal space;

a piston disposed within the internal space for dividing the internal space into first and second chambers and connected to the other of the vehicle body and the suspension member for relative movement with respect to the cylinder tube, the first and second chambers being filled with a working fluid;

a fluid communication means for establishing fluid communication between the first and second chambers with a limited fluid flow rate for generating a damping force against relative motion between the piston and the cylinder tube;

a first valve means associated with the fluid communication means for controlling flow restriction of the fluid communication means in a first direction of piston stroke, the valve means being variable of flow restriction characteristics for varying damping characteristics of the shock absorber;

a second valve means associated with the fluid communication means for controlling flow restriction of the fluid communication means in a second direction of piston stroke opposite to the first piston stroke direction, the valve means being variable of flow restriction characteristics for varying damping characteristics of the shock absorber;

a first piezoelectric means for monitoring fluid pressure in the fluid pressure in the first chamber during the second direction of piston stroke and producing a first pressure indicative signal indicative of magnitude fluid pressure level, the first piezoelectric element being responsive to a control signal for adjusting the flow restriction during the first direction of piston stroke;

a second piezoelectric means for monitoring fluid pressure in the fluid pressure in the second chamber during the first direction of piston stroke and producing a second pressure indicative signal indicative of magnitude fluid pressure level, the second piezoelectric element being responsive to the control signal for adjusting the flow restriction during the second direction of piston stroke; and the first and second piezoelectric means being connected to an externally provided controlling means, the controlling means receiving the first and second pressure indicative signal, for selecting one of the first and second pressure indicative signal depending upon the piston stroke direction for deriving a variation rate of the selected one of first and second pressure indicative signals, and detecting the variation rate reaching a peak value for producing the control signal for harder damping characteristics and detecting the variation rate decreasing across a predetermined second value for producing the control signal for softer damping characteristics.

BRIEF DESCRIPTION OF THE DRAWINGS

The present invention will be understood more fully from the detailed description of the invention given herebelow and from the accompanying drawings of the present invention, which, however, should not be taken to limit the invention to the specific embodiment, but are for explanation and understanding only.

In the drawings:

FIGS. 6(a–d) are timing charts showing variations of suspension mode in relation to variations of damping forces to be generated in the shock absorber;

DESCRIPTION OF THE PREFERRED EMBODIMENT

Figure 1:
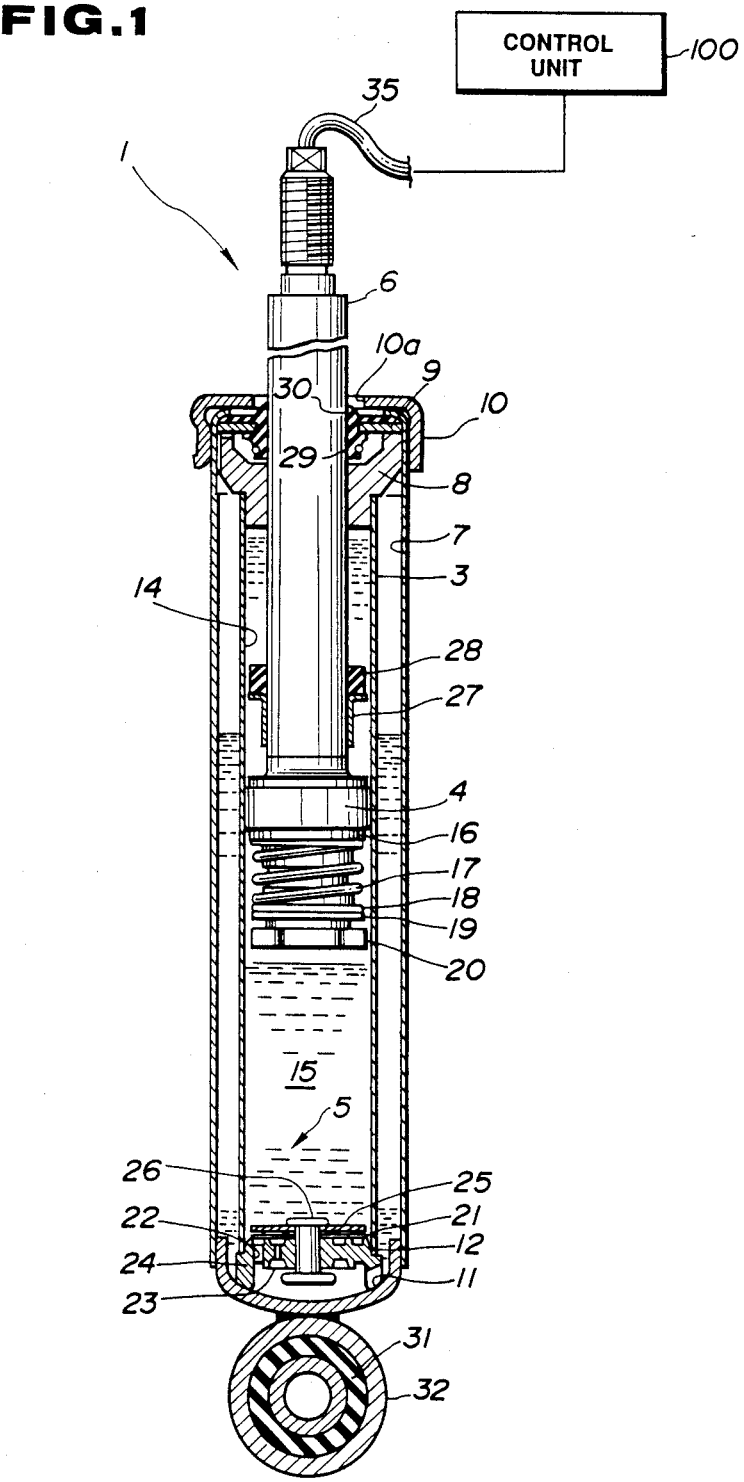
FIG. 1 is a section of preferred embodiment of a variable damping force shock absorber according to the present invention, which is associated with a control unit implementing a preferred process of suspension control.

Referring now to the drawings, particularly to FIG. 1, the preferred embodiment of a shock absorber, according to the present invention, serves as a principle component of the preferred embodiment of an automotive suspension system, according to the invention. The shown shock absorber 1 comprises a double action type shock absorber variable of damping characteristics. The shock absorber 1 has inner and outer cylinder tubes 3 and 2. The inner and outer cylinders 3 and 2 are arranged in coaxial arrangement for defining an annular chamber 7 which serves as a reservoir chamber.

A piston assembly 4 is disposed within the internal space of the inner cylinder tube 3 for dividing the internal space into upper and lower working chambers 14 and 15. The piston assembly 4 is supported on the lower end of a piston rod 6. The piston rod 6 is a guided by a rod guide 8 is engaged in the top end opening of the inner cylinder tube 3. The rod guide 8 cooperates with a piston seal 9 and a stopper plate 10 to form an upper plug assembly for sealingly closing the top ends of the inner and outer cylinder tubes 3 and 2.

The top end of the piston rod 6 is connected to a vehicle body (not shown) in per se known manner. On the other hand, a connecting eye 32 with an eye bushing 31 is provided on the lower end of the outer cylinder tube 2. The outer cylinder tube 2 is connected to a suspension member (not shown) rotatably supporting a road wheel. By this, the shock absorber 1 is disposed between the vehicle body and the suspension member. The shock absorber 1 is compressed in response to bounding stroke motion, in which the vehicle body and the suspension member are shifted to approach to each other, and expanded in response to a rebounding stroke motion, in which the vehicle body and suspension member are shifted away to each other. In response to the bounding stroke motion of the vehicle body and the suspension member, the piston assembly 4 strokes in compression stroke direction with compressing the lower working chamber 15. This causes increasing of working fluid pressure in the lower working chamber and decreasing of the working fluid pressure in the higher working chamber. On the other hand, in response to the rebounding stroke motion of the vehicle body and the suspension member, the piston assembly 4 strokes in expansion stroke direction with compressing the higher working chamber 14. Therefore, the fluid pressure in the upper working chamber 14 is increased and the fluid pressure in the lower working chamber 15 is decreased. The fluid reservoir chamber 7 is normally maintained at a pressure substantially corresponding to fluid pressure in the lower working chamber 15, stroke motion.

The lower end opening of the inner cylinder 3 is closed by a bottom valve assembly 12 which defines a communication path 11. The bottom valve assembly 12 thus establishes fluid communication between the fluid reservoir chamber 7 and the lower working chamber 15.

The piston assembly 4 accompanies an expansion valve 16 which is effective in a piston expansion stroke to produce a damping force. The expansion valve 16 is associated with a bias spring 17 which is active on the expansion valve 16 to constantly bias the latter in upward direction. The bias spring is mounted on the lower end of the piston rod 6 by means of an adjuster nut 18 and a lock nut 19. An adjuster nut 20 also engages with the lower end of the piston rod 6.

The bottom valve assembly 5 has a check valve 21 associated with a port 22 for openably closing the port. The check valve 21 is designed to open during piston expansion stroke to permit fluid flow from the reservoir chamber 7 to the lower working chamber 15. The bottom valve 5 is also provided with a compression valve 23 which is associated with the lower end of an orifice 24 to open in response to compression stroke in order to establish fluid communication from the lower working chamber 15 to the reservoir chamber 7. The check valve 21 and the compression valve 23 are mounted and secured on a bottom valve body 12 by means of a clamping pin 26. A stopper plate 25 is also mounted on the bottom valve body 12 in order to restrict magnitude of opening of the check valve 21. With the shown construction, the check valve 21 is responsive to the pressure difference between the lower working chamber 15 and the fluid reservoir chamber 7 to be shifted to the open position for introducing the working fluid in the fluid reservoir chamber into the lower working chamber. On the other hand, during piston compression stroke, pressure difference between the lower working chamber 15 and the fluid reservoir chamber 7 is created to shift the compression valve 23. By opening of the compression valve 23, a limited flow rate of the working fluid is permitted to flow from the lower working chamber 15 to the fluid reservoir chamber 7 with generating a damping force.

A rebounding stopper 28 which is made of an elastic material, such as a rubber, is mounted on the piston rod 6 by means of a retainer 27. The rebounding stopper 28 protects the piston assembly 4 from direct collision onto the lower end of the rod guide 8.

The stopper plate 10 is clamped onto the upper end of the outer cylinder tube 2. The stopper 10 defines a center opening 10a, through which the piston rod 6 extends. A rubber bushing (not shown) engages with the periphery of the center opening 10a of the stopper plate 10 for slidingly and sealingly guide the piston rod 6. A main lip 29 and a dust lip 30 are also provided in the upper plug assembly. The main lip 29 sealing contact with the outer periphery of the piston rod for establishing a fluid tight seal. On the other hand, the dust lip 30 is provided in the vicinity of the stopper plate and contacts with the outer periphery of the piston rod 4 to establish fluid tight seal so as to prevent the muddy water, dust and so forth.

The piston assembly 4 is designed to vary damping characteristics to generate damping force in response to vibration input according to variable characteristics in different damping mode. In order to control the damping mode of the piston assembly 4, a control unit 100 is connected to the piston assembly via a harness 35 which extends through the piston rod.

Figure 2:
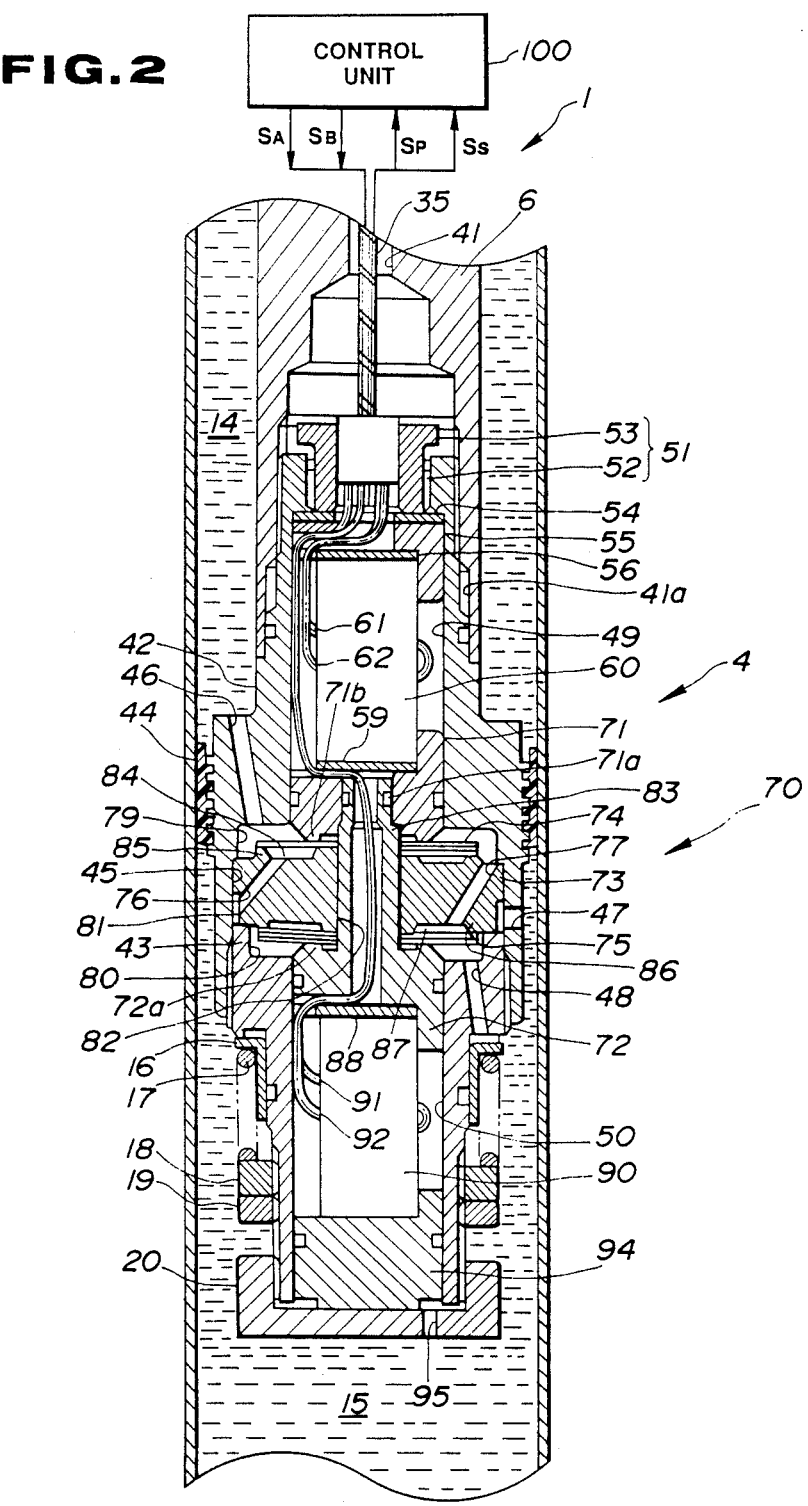
FIG. 2 is an enlarged section of the major part of the preferred embodiment of the variable damping force shock absorber, according to the invention.

FIG. 2 shows the detailed construction of the piston assembly 4 employed in the preferred embodiment of the shock absorber 1 of FIG. 1. As seen, the piston rod 6 defined an axially extending through opening 41 through which the wiring harness 35 extends. The lower end of the through opening 41 is communicated with a threaded groove 41a forming a piston receptacle. The piston assembly 4 includes a piston body 42 which has an upward extension which threadingly engages with the threaded groove 41a of the piston rod 6 so that the piston body 42 is firmly mounted on the lower end of the piston rod 6. The piston body 42 has an outer periphery mating with the inner peiphery of the inner cylinder 3. A low friction seal member 44 which is made of a low friction material, such as a teflon, engages on the outer periphery of the piston body 42 for establishing the fluid tight seal between the inner periphery of the inner cylinder 3. The piston body 42 has a threaded lower end, to which the upper end of a sleeve 43 engages. The aforementioned adjusting nut 18, the lock nut 19 and the adjusting nut 20 are engaged onto the outer periphery of the lower end portion of the sleeve 43.

The piston body 42 defines an internal space 45 which is in communication with the upper and lower working chambers via communication path 46 and 47 defined therethrough. On the other hand, the sleeve 43 defines a through opening 48 for communication between the internal space 45 and the lower working chamber 15. The expansion valve 16 is associated with the end of the through opening 48 opening to the lower working chamber 15 so as to restrict fluid flow path area for generating damping force. The expansion valve 16 is responsive to a fluid pressure overcoming the spring force of the bias spring 17 to widen the path area for pressure relieving function.

The assembly of the piston body 42 and the sleeve 43 defines first and second chambers 49 and 50 of essentially circular cross section. These first and second chambers 49 and 50 have smaller diameter than the space 45 and communicated with the later. A first piezoelectric element 60 is disposed within the first chamber 49. The first piezoelectric element 60 has an upper section associated with an adjusting mechanism 51. The adjusting mechanism 51 comprises an adjuster screw 53 engaging with a female thread 52 formed on the inner periphery of the top end of the piston body 42. The adjuster nut 53 has a lower end coupled with an upper end plate 56 fixed onto the upper end of the piezoelectric element 60 via a contact plate 54 and a cap 55. The adjuster screw 53 is manually rotatable for axial shifting to cause axial displacement of the piezoelectric element 60. The piezoelectric element 60 is associated with a slider member 71 via a lower end plate 59.

Similarly, a second piezoelectric element 90 is disposed within the second chamber 50. The second piezoelectric element 90 is supported within the second chamber by means of a cap 94 and the adjuster nut 20, so that the axial position thereof can be adjusted by means of the adjusting nut. The upper end of the second piezoelectric element 90 is associated with a valve core 72 via an upper end plate 88.

The slider 71 and the valve bore 72 are associated with a valve body 73 to form a damping mode control mechanism 70. As seen, the valve body 73 is disposed within the space 45 to define therein upper and lower annular chambers 79 and 80. The valve body 73 further defines an annular chamber 81 defined between the outer periphery of the valve 73 and the inner peirphery of the piston body 42. The upper annular chamber 79 is in communication with the upper working chamber 14 via a communication path 48. On the other hand, the lower annular chamber 80 is in communication with the flow working chamber 15 via the through opening 48. The annular chamber 81 is in communication with the lower working chamber 15 with the fluid path 47. The valve body 73 defines a center opening 82 through which an upper cylindrical section 83 of the valve core 72 extend, and communication orifices 76 and 77. The communication orifice 76 opens to an annular groove 84 formed on the upper surface of the valve body and surrounded by an annular land 85. The annular groove 84 is exposed to the upper annular chamber 79. The communication orifice 76 also opens to the annular chamber 81. On the other hand, the communication orifice 77 opens to an annular groove 87 formed on the lower surface of the valve body 72 and surrounded by an annular land 85. The annualar groove 86 is exposed to the lower annular chamber 80. The communication orifice 77 also opens to the upper annular chamber 79.

Upper and lower valve members 74 and 75 are provided for openably closing the annular grooves 84 and 87 and whereby blocking fluid communication between the annular grooves and the associated annular chambers 79 and 80. The valve members 74 and 75 comprises leaf springs resiliently deformable in response to the pressure exerted thereto. Normally, the valve members 74 and 75 are supported at the center boss sections projecting at the center portion of valve body. At this position, the lever length of the valve members 74 and 75 is relatively large to have an initial stiffness to cause resilient deformation in response to the fluid pressure exerted thereto. On the other hand, when the annular projections 71b and 72a of the slider 71 and the valve core 72 are active on the valve member 74 an 75 when the slider and valve cores are operated by the effect of the piezoelectric elements 60 and 90, the lever lengths of the valve members are reduced to increase stiffness for generating greater damping force in response to vibration input. In the following discussion, the damping mode where the valve member 74 and 75 operates in smaller stiffness, in which the annular projections 71b and 72 of the slider and valve core are not active, will be referred to as SOFT mode. On the other hand, the damping mode where the annular projections are active to increase stiffness, will be hereafter referred to as HARD mode.

It should be noted that the valve members 74 and 75 can comprise a plurality of thin disc shaped relief springs for resilient deformation in response to the fluid pressure exerted thereonto.

As seen from FIG. 2, the first and second piezoelectric elements 60 and 90 are connected to the control unit 100 via cables 61, 62, 91 and 92 which forms the wiring harness. As can be clearly seen from FIG. 4, the cables 61 and 91 connect respectively associated piezoelectric elements 60 and 90 to the ground. On the other hand, the cables 62 and 92 connect the piezoelectric elements 60 and 90. Each of the piezoelectric elements 60 and 90 comprises a plurality of thin disc shaped piezoelectric plates piled up in series. Each of the piezoelectric plates respectively having a pair of electrodes. As is well known, when a voltage is applied to such piezolectric plates to cause electrodistortion to expand and contact the axial length. The magnitude of electrodistortion is variable depending upon the magnitude of voltage applied to the piezoelectric plates. Such electrodistortion may cause mechanical distortion of the piezoelectric element to cause variation of the axial length.

On the other hand, when the fluid pressure is applied to the piezoelectric elements 60 and 90, each of the piezoelectric plate as the components of the piezoelectric elements is caused mechanical distortion for producing an electric power. The magnitude of the electric power to be generated by the piezoelectric elements 60 and 90 is variable depending upon the magnitude of the mechanical distortion and whereby corresponding to the magnitude of the pressure exerted on the piezoelectric elements. In the practical construction, the first piezoelectric element 60 is subject a fluid pressure of the annular chamber 81 exerted on the valve member 74 which corresponds to the fluid pressure in the lower working chamber 15, via the slider. The first piezoelectric element 60 is thus produces a compression mode pressure indicative signal Sp. On the other hand, the second piezoelectric element 90 is subject fluid pressure in the upper annular chamber 79 exerted on the valve member via the valve member 75 and the valve core 72, which fluid pressure corresponds to that in the upper fluid chamber 14. The second piezoelectric element 90 thus produces a expansion mode pressure indicative signal Ss. As will be appreciated, the magnitude of the compression mode pressure indicative signal Sp and the expansion mode pressure indicative signal Ss are variable depending upon the magnitude of pressure in the upper and lower working chambers 14 and 15. In addition, in the piston compression stroke, the fluid pressure in the lower working chamber 15 is also exerted on the second piezoelectric element 90 via the adjuster nut 20 and a cap 94. Therefore, even in the piston expansion stroke, the second piezoelectric element 90 outputs the expansion mode pressure indicative signal Ss. Therefore, in the piston expansion stroke, only expansion mode pressure indicative signal Ss is output from the piezoelectric element 90. On the other hand, in the piston compression stroke, both of the compression mode and expansion mode pressure indicative signal $S_P$ and $S_s$ are output from the first and second piezoelectric elements 60 and 90.

The piezoelectric elements 60 and 90 feeds the compression mode pressure indicative signal Sp and the expansion mode pressure indicative signal Ss to the control unit 100. The control unit 100 processes these compression mode and expansion mode pressure indicative signals Sp and Ss to produce an expansion mode control signal $S_A$ and a compression mode control signal $S_B$. The expansion mode control signal $S_A$ is fed to the first piezoelectric element 60 for controlling axial length thereof to adjust the position of the valve core 72 and whereby adjust the stiffness of the valve members 74 and 75. By adjusting the stiffness of the valve member 75, the damping characteristics in response to the piston expansion stroke can be switched between HARD mode and SOFT mode. Similarly, the compression mode control signal $S_B$ is applied to the second piezoelectric element 90 for controlling the axial length thereof to adjust the position of the slider 71 relative to the valve members 74 and 75 and whereby adjusts the stiffness of the associated valve member in order to switch the damping mode between HARD mode and SOFT mode. By this, the damping characteristics in the piston compression stroke can be adjusted.

Figure 3:
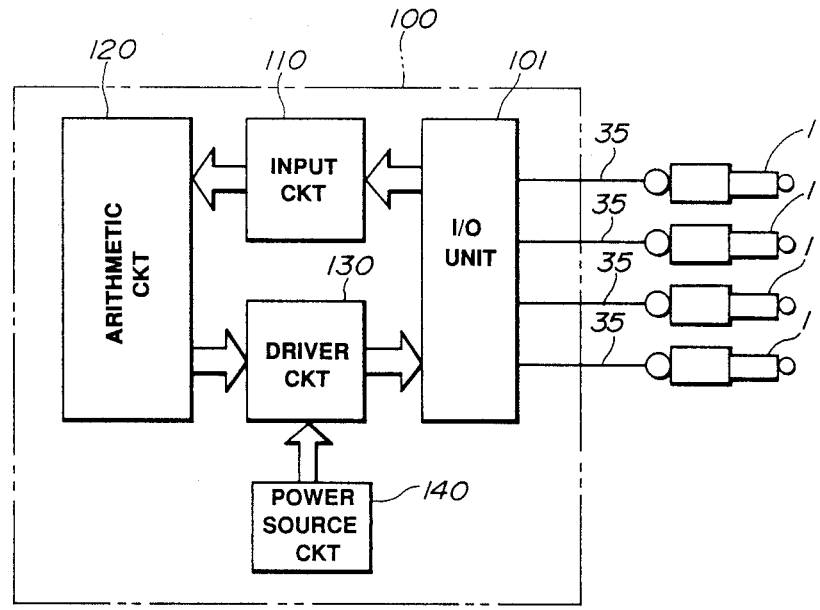
FIG. 3 is a block diagram of the control unit employed in the preferred embodiment of an automotive suspension system and designed for implementing the preferred suspension control process.
Figure 4:
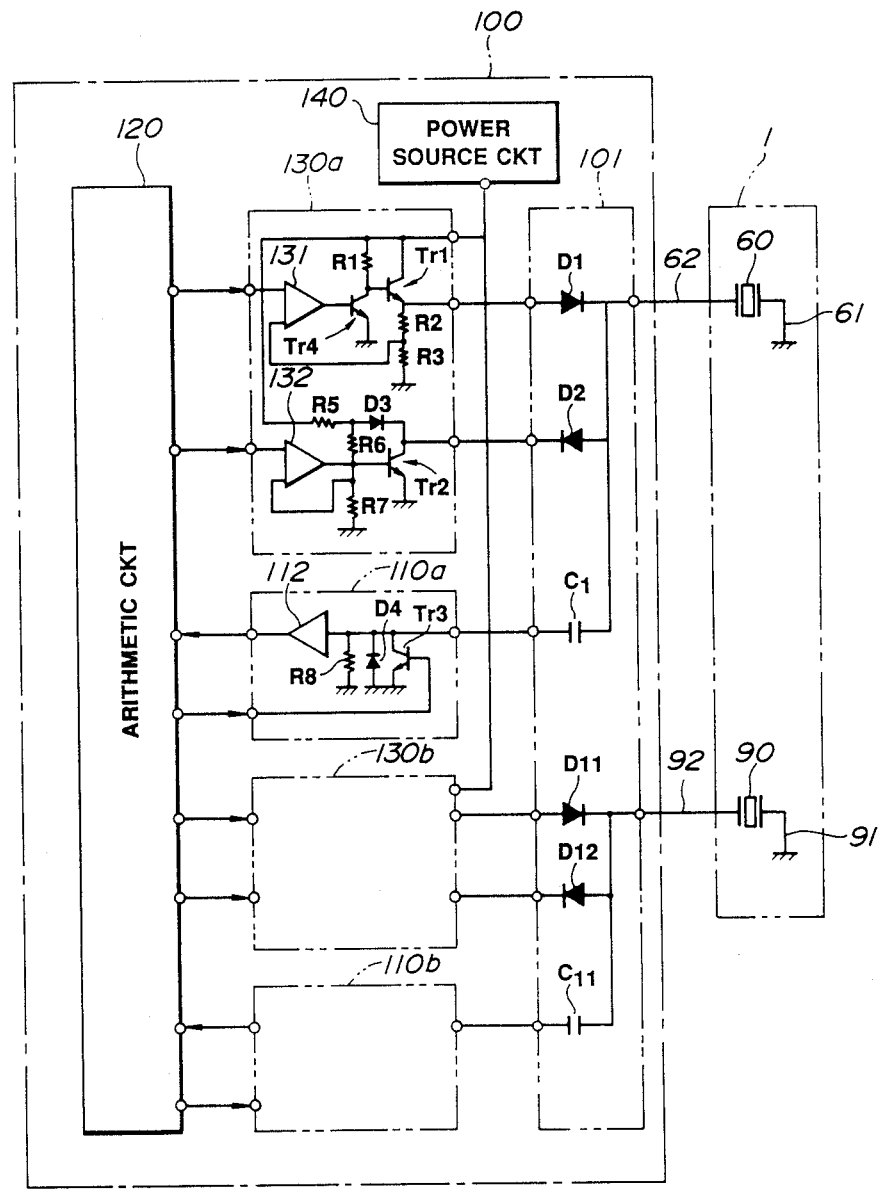
FIG. 4 is a detailed block diagram of the control unit of FIG. 3.

As shown in FIG. 3, the control unit 100 comprises a microprocessor based circuit including an input/output (I/O) port 101, an input circuit 110, an arithmetic circuit 120, a driver circuit 130 and a driver power source circuit 140. The I/O unit 101 is connected to respective damping control mechanisms 70 of the shock absorbers 1 disposed in front-left, front-right, rear-left and rear-right suspension systems via the cables 52 and 92 of the wiring harnesses 35. The compression mode pressure indicative signals $S_p$ and the expansion mode pressure indicative signals Ss generated by the piezoelectric elements 60 and 90 of respective shock absorbers 1 are input to the control unit 100 through the I/O port 101. The I/O unit 101 has a plurality of control channels respectively adapted to control the piezoelectric elements 60 and 90 in respective shock absorbers 1 of front-left, front-right, rear-left and rear-right suspension systems, though FIG. 4 shows only one shock absorber 1. Each control channel has first and second I/O sections 101a and 101b for receiving pressure indicative signals Sp and Ss and outputting the control signals $S_A$ and $S_B$. The first control section 101a has a capacitor $C_1$ for receiving the compression mode pressure indicative signal Sp and serving as a filter for removing noise direct current component in input signal. The first control section 101a also has a pair of diodes $D_1$ and $D_2$ arranged at opposited polarities.

Similarly, the second control section 101b has a capacitor $C_{11}$ for receiving the compression mode pressure indicative signal Ss and serving as a filter for removing noise direct current component in input signal. The second control section 101b also has a pair of diodes $D_{11}$ and $D_{12}$ arranged at opposite polarities.

The capacitors $C_1$ $C_{11}$ are connected to first and second sections 110a and 110b of the input circuit 110 respectively. The first section 130a includes a switching transistor $Tr_3$ and an amplifier 112. The switching transistor $Tr_3$ has a base electrode connected to one output terminal of the arithmetic circuit to receive therefrom a selector command. The transistor $Tr_3$ has a collector electrode connected to a junction between the capacitor $C_1$ of the I/O unit 101 and the amplifier 112. The emitor electrode of the switching transistor $Tr_3$ is grounded. In addition, the first section 110a includes a diode $D_4$ and a resistor $R_8$. With the shown construction, the selector command is normally held OFF to input LOW level command to the base electrode of the switching transistor $Tr_3$. Therefore, the switching transistor $Tr_3$ is normally held OFF to break connection between the junction and the ground. At this position, the compression mode pressure indicative signal Sp is fed to the amplifier 112 and subsequently to the arithmetic circuit 120. On the other hand, the switching transistor $Tr_3$ is responsive to the HIGH level selector command to turn ON to establish grounding circuit for grounding the junction between the capacitor $C_1$ and the amplifier 112. As a result, the compression mode pressure indicative signal Sp from the first piezoelectric element 60 is grounded. Therefore, the input to arithmetic circuit 120 from the amplifier 112 becomes substantially zero.

Figure 5:
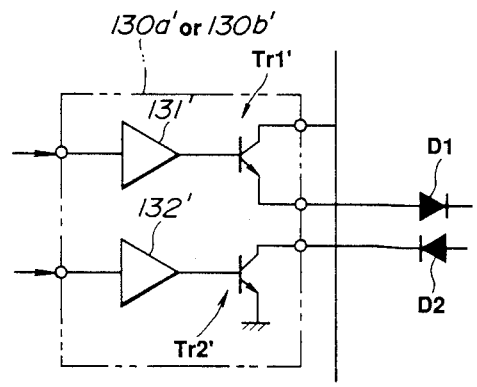
FIG. 5 is a circuit diagram of the simplified modification of an output circuit in the control unit.

It should be appreciate, though FIG. 5 shows simple block 110b to show the second section of the input circuit, the circuit construction and function of the second section are identical to that discussed with respect to the first section.

The driver circuit 130 also includes first and second sections 130a and 130b. The first section 130a of the driver circuit 130 has a control section 130c and a switching section 130d. Both of the control section 130c and the switching section 130d are connected to the arithmetic circuit 120 for receiving the expansion mode control signal $S_A$. The control section 130c has an operational amplifier 131 high compares the expansion mode control signal level $S_A$ with a feedback signal level fed back from the output end via a voltage divider constituted by resistors $R_2$ and $R_3$. As long as the expansion mode control signal level is higher than the feedback signal level, the output level of the operational amplifier 131 outputs LOW level signal to maintain the input level of a gate electrode of a transistor $Tr_4$ at LOW level. Therefore, the bias at the collector electrode of the transistor $Tr_4$ becomes HIGH to turn a transistor $Tr_1$ ON. By turning ON of the transistor $Tr_1$, the driver voltage is fed to the piezoelectric element 60 to expand the axial length of the latter to switch the damping mode of the damping mode control mechanism 70 from SOFT mode to HARD mode.

On the other hand, the switching section 130d also has an operational amplifier 132. The operational amplifier 132 receives the expansion mode control signal $S_A$ and compares the expansion mode control signal level with a reference level which is input from the driver power source circuit via a resistor $R_5$ and a voltage divider constituted by resistors $R_6$ and $R_7$. With this control connection, the output of the operational amplifier 132 is maintained at LOW level to maintain a switching transistor $Tr_2$ at non-conductive state for blocking communication between the diode $D_2$ and the ground while the input level from the arithmetic circuit 120 stays lower than a reference level input from the voltage divider of the resistors $R_6$ and $R_7$. It should be noted that the reference level is determined by the resistances of the resistors $R_6$ and $R_7$, which reference level is set at a level corresponding to a predetermined initial stress level to exert on the first piezoelectric element 60. On the other hand, when the expansion mode control signal level $S_A$ from the arithmetic circuit is higher than or equal to the reference level, the output level of the operational amplifier 132 turns into HIGH level to turn the transistor $Tr_2$ ON. As a result, the diode $D_2$ is connected to the ground via the transistor $Tr_2$. Therefore, the voltage signal as the driver voltage on the cable 62 is grounded so that the expansion mode control signal voltage $S_A$ applied to the first piezoelectric element 60 can be discharged. The Transistor $Tr_2$ is maintained in conductive state until the potential at the first piezoelectric element 60 drops to the initial level, at which the input level from the arithmetic circuit is lowered across the reference level.

It should be noted while the shown construction employs a specific circuit construction to implement the desired mode switching operation for switching operational mode of the first piezoelectric element 60 between a sensor mode for monitoring the fluid pressure in the lower working fluid chamber 15 and an actuator mode for controlling damping mode, it is possible to employ different construction of circuit. For example, as shown in FIG. 5, each of the output circuits 130a and 130b can comprise a pair of buffer amplifier 131' and 132' and transistors $Tr_1'$ and $Tr_2'$. In such case, the arithmetic circuit 120 selectively feeds the expansion mode control signal $S_A$ for the buffer amplifiers 131' and 132'. Namely, while the harder damping characteristics is to be ordered, the arithmetic circuit 120 feeds the expansion mode control signal $S_A$ to the buffer amplifier 131' to turn the transistor $Tr_1'$ conductive to apply controlled voltage of the expansion mode control signal. On the other hand, in order to lower damping characteristics, the expansion mode control signal is fed to the buffer amplifier 132' to make the transistor $Tr_2$ ON to complete grounding circuit for discharging the control signal voltage applied to the first piezoelectric element 60.

As will be seen before herefrom, the piezoelectric element 60 acting for monitoring the fluid pressure level in the lower working chamber 15, the capacitor $C_1$ of the first section 101a of the I/O unit 101, the first section 110a, the arithmetic circuit 120, the second section 130b of the output circuit and pair of diodes $D_{11}$ and $D_{12}$ of the second section 101b of the I/O unit 101, and the piezoelectric element 90 acting for adjusting the damping mode of the damping mode control mechanism 70 form a compression mode control channel. On the other hand, the second piezoelectric element 90 acting for monitoring the fluid pressure level in the upper working chamber 14, the capacitor $C_{11}$ of the second section 101b of the I/O unit 101, the second section 110b, the arithmetic circuit 120, the second section 130a of the output circuit and pair of diodes $D_1$ and $D_1$ of the first section 101a of the I/O unit 101, and piezoelectric element 60 acting for adjusting the damping mode of the damping mode control mechanism 70 form an expansion mode control channel.

In order to initially set the piezoelectric elements 60 and 90, adjustment is performed by means of the adjuster nuts 53 and 20. Namely, a predetermined voltage is applied for respective piezoelectric elements 60 and 90. At this position, the adjusted nuts 53 and 20 are rotated to adjust stress to be exerted on the piezoelectric elements 60 and 90. This adjustment is continued until the outlet levels of the piezoelectric elements 60 and 90 become a predetermined level.

The operation to be performed in the preferred embodiment of the suspension system will be discussed herebelow with reference to FIGS. 6 to 8.

As shown in FIG. 6(c), the fluid pressure in the upper working chamber 14 is monitored by the second piezoelectric element 90 during the piston expansion stroke. The piezoelectric element 90 is thus produces the the expansion mode pressure indicative signal Ss. At this time, since the output first piezoelectric element 60 is maintained at zero level, discrimination can be made that the piston is in the expansion stroke. Discrimination is made by the arithmetic circuit 120 in the control unit 100. Then, the arithmetic circuit 120 performs arithmetic operation to derive variation rate of the expansion mode pressure indicative signal Ss. The variation rate of the pressure indicative signals Ss and Sp is shown in FIG. 6(c). When the variation rate reaches a predetermined value, the expansion mode control signal ordering harder damping characteristics is output to switch the damping mode from SOFT mode to HARD mode, as shown in periods labeled H in FIG. 6(d). The damping mode is switched back to SOFT mode from the HARD mode when the variation rate decreases across a zero.

On the other hand, during the piston compression stroke, the fluid pressure in the lower working chamber 15 is monitored by both of the first and second piezoelectric elements 60 and 90. The first piezoelectric element 60 then produces the compression mode pressure indicative signal Sp. At the same time, the second piezoelectric element 90 produces the expansion mode pressure indicative signal Ss. Therefore, judgement is then made that the piston is in the compression stroke by the arithmetic circuit 120. Therefore, the arithmetic circuit 120 calculates variation rate of the compression mode pressure indicative Sp. When the variation rate derived on the basis of the compression mode pressure indicative signal Sp reaches the predetermined value, the compression mode control signal $S_B$ is output to the second piezoelectric element 90 to switching damping mode from the SOFT mode to HARD mode. Similarly to the expansion mode, the damping mode will be switched back to the SOFT mode when the variation rate decreases across zero.

Figure 7:
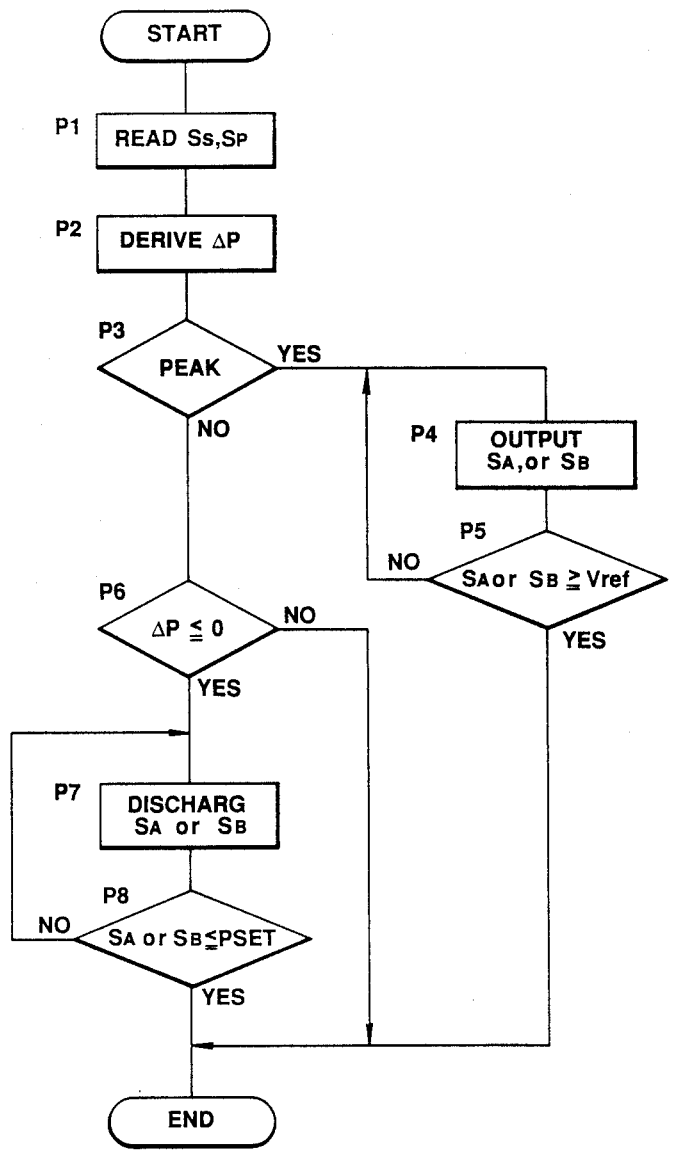
FIG. 7 is a flowchart showing the preferred process of suspension control to be performed in the preferred embodiment of the suspension system.

FIG. 7 shows a flowchart showing operation performed in the arithmetic circuit. Immediately after starting execution, the expansion mode pressure indicative signal Ss and the compression mode pressure indicative signal Sp are read out at a step P1. Then, discrimination is made for the piston stroke direction on the basis of the read expansion mode pressure indicative signal Ss and compression mode pressure indicative signal Sp. As set forth, the piston expansion stroke is detected when the read compression mode pressure indicative signal Sp is held zero. On the other hand, when the compression mode pressure indicative signal Sp is greater than zero, the piston compression stroke is detected. The arithmetic circuit 120 thus selects one of the expansion mode pressure indicative signal Ss and the compression mode pressure indicative signal. Then, at a step P2, variation rate $\Delta P$ is derived on the basis of the selected one of the expansion mode pressure indicative signal Ss and the compression mode pressure indicative signal Sp. Practically, the variation rate $\Delta P$ is calculated by differentiating the selected one of the pressure indicative signals Ss and Sp.

Here, the variation rate $\Delta P$ of the pressure to be exerted on the first and second piezoelectric elements 60 and 90 becomes maximum at the initial space of the piston expansion and compression stroke and becomes minumum (zero) at the peak of vibration. On the other hand, the piston stroke speed becomes higher according to increasing the piston stroke and according to shortening of vibration cycle period. Therefore, by monitoring the variation rate $\Delta P$, magnitude of input vibration can be detected for quicker response. This may provide higher response characteristics to the input vibration in controlling the suspension mode.

It should be appreciated, it is possible to provide a step between the steps P1 and P2 to check the frequency range of the pressure indicative signals for performing suspension control on the basis of the input pressure indicative signal within a predetermined frequency range.

At a step P3, the peak of the variation rate $\Delta P$ is detected. When the peak of the variation rate $\Delta P$ is detected as checked at the step P3, one of the expansion mode control signal $S_A$ or the compression mode control signal $S_B$ is output to the corresponding one of the first and second piezoelectric elements 60 and 90 depending upon the discriminated piston stroke direction. Then, at a step P5, the voltage level of the expansion mode control signal $S_A$ or the compressin mode control signal $S_B$ output at the step P4, is checked whether the voltage level is higher than or equal to a voltage threshold level $V_{ref}$. The voltage threshold level $V_{ref}$ is set at a minimum voltage for causing distortion in the corresponding one of the first and second piezolectric element 60 and 90 in order to switch damping mode from the SOFT mode to the HARD mode. Unless, the control signal voltage level as checked at the step P5 becomes higher than or equal to the voltage threshold level $V_{ref}$, process returns to the step P4. The steps P4 and P5 are repeated until the control signal voltage level becomes higher than or equal to the minimum voltage level for driving the associated one of the first and second piezolectric element 60 and 90. When the control signal voltage level becomes higher than or equal to the voltage threshold level $V_{ref}$ as checked at the step P5, then process goes END.

Though the shown embodiment switches the damping mode between two stages, i.e. HARD mode and SOFT mode, it is possible to vary the damping characteristics in either in or both in the HARD and SOFT mode according to the vibration magnitude. Namely, since the distortion magnitude may essentially linearly proportional to the voltage applied thereto, linear or stepless variation of the damping characteristics can be obtained by linearly or steplessly varying the voltage of the control signal. Practically, it may be possible to vary the control signal voltage according to variation of the variation rate $\Delta P$. Furthermore, it may also be possible to determine the control signal voltage corresponding to the peak level of the variation rate $\Delta P$.

On the other hand, the peak of the variation rate $\Delta P$ is not detected as checked at the step P3, check is performed whether it indicates the variation rate is zero, at a step P6. If the variation rate $\Delta P$ is greater than zero as checked at the step P6, process directly goes to END.

On the other hand, when the variation rate $\Delta P$ is zero as checked at the step P6, the switching transistor $Tr_2$ in the corresponding one of the first and second sections 130a and 130b is turned ON to discharge the voltage applied to the piezoelectric element 60 and 90, at a step P7. Then, at a step P8, one of the expansion mode pressurs indicative signal Ss and the compression mode pressure indicative signal Sp, which is selected at the step P1, is again checked against a set value $P_{set}$. As long as the checked pressure indicative signal is greater than the set value $P_{set}$ as checked at the step P8, the steps P7 and P8 are repeated to discharge the voltage applied corresponding one of the piezoelectric element 60 and 90 at a level lower than or equal to the set value $P_{set}$.

Figure 8:
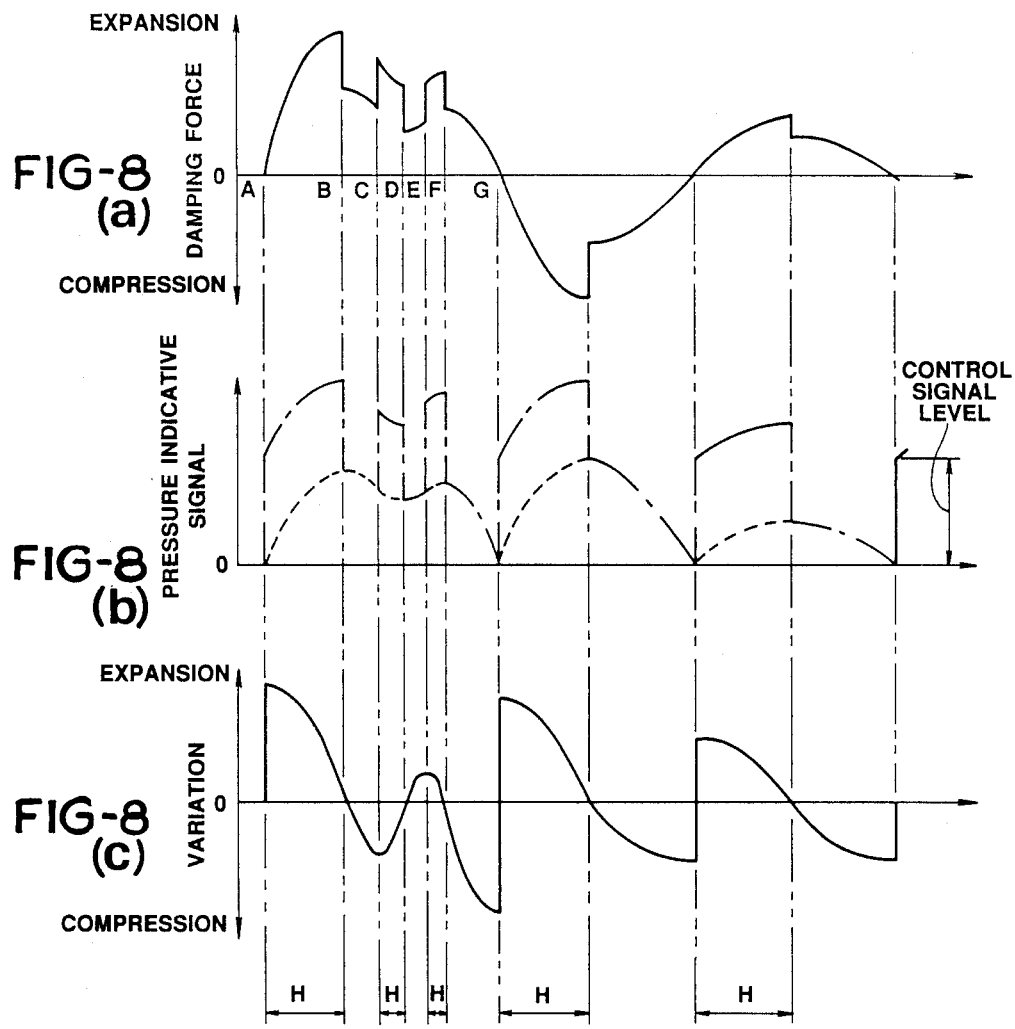
FIGS. 8(a–c) are timing charts showing control operations performed in the preferred embodiment of the suspension system.

FIG. 8 shows timing chart showing example of operation practically performed in the preferred embodiment of the suspension system according to the present invention. In the shown example, it is assumed that the variation rate $\Delta P$ of the expansion mode pressure indicative signal Ss and the compression mode pressure indicative signal Sp varies as shown in FIG. 8(c). At a point A, the variation rate $\Delta P$ rapidly increased to be greater than or equal to the predetermined value $P_{ref}$.

Then, the damping mode is switched from SOFT mode to HARD mode as shown in the period between the point A and a point B. During this period, the pressure indicative signal Ss or Sp is shifted in a magnitude corresponding to the voltage level of the driver signal exerted on the corresponding piezoelectric element, as shown by one-dotted line in FIG. 8(b). As can be seen from FIG. 8(b), the pressure indicative signal thus varies according to variation of the fluid pressure in the corresponding one of the upper and lower working chamber as shown by broken line in FIG. 8(b). At the point B, the vibration reaches the peak thus the variation rate $\Delta P$ becomes zero. In response to this, the damping mode is switched from HARD mode to SOFT mode.

As seen from FIG. 8(a), assuming that the vibration is caused in rebounding direction to cause expansion stroke of the piston, the damping force created against the piston expansion stroke is increased by setting the damping mode at HARD mode as that shown in the period between the point A and the point B. After B, the piston strokes in the compression direction to return the initial position. In such case, the damping mode is set at SOFT mode for effectively absorbing the vibration energy as shown in the period between the point B and a point C. At the point C, variation rate $\Delta P$ in the compression mode reaches a value greater than the predetermined value $P_{ref}$ to again causing switching of the damping mode from SOFT mode to HARD mode. Therefore, from the point C to a point D greater damping force against the piston stroke is generated. Similarly to the process set forth with respect to the point B, the variation rate $\Delta P$ becomes zero at the point D. Then, the damping mode is switched into SOFT mode from the HARD mode. By repeating the foregoing process, the damping modes are switched between HARD mode and SOFT mode during the periods between the points D and E, points E and F and points F and G.

As will be appreciated herefrom, since the shown embodiment performs damping mode control in piston expansion and compression strokes independently of each other, effective suppression of piston strokes and absortion of the vibration energy can be achieved. Furthermore, in the shown embodiment, since the first piezoelectric element 60 is active for detecting fluid pressure in the lower working chamber 15 during piston compression stroke and the second piezoelectric element 90 is active for adjusting damping mode between the HARD mode and SOFT mode in the piston compression stroke; and since the second piezoelectric element 90 is active for detecting fluid pressure in the upper working chamber 14 during piston expansion stroke and the second piezoelectric element 60 is active for adjusting damping mode between the HARD mode and SOFT mode in the piston expansion stroke, monitoring of the fluid pressure and damping mode control can be performed independently at the same time. Therefore, damping mode control with high precision and high response characteristics can be obtained.

Figure 9:
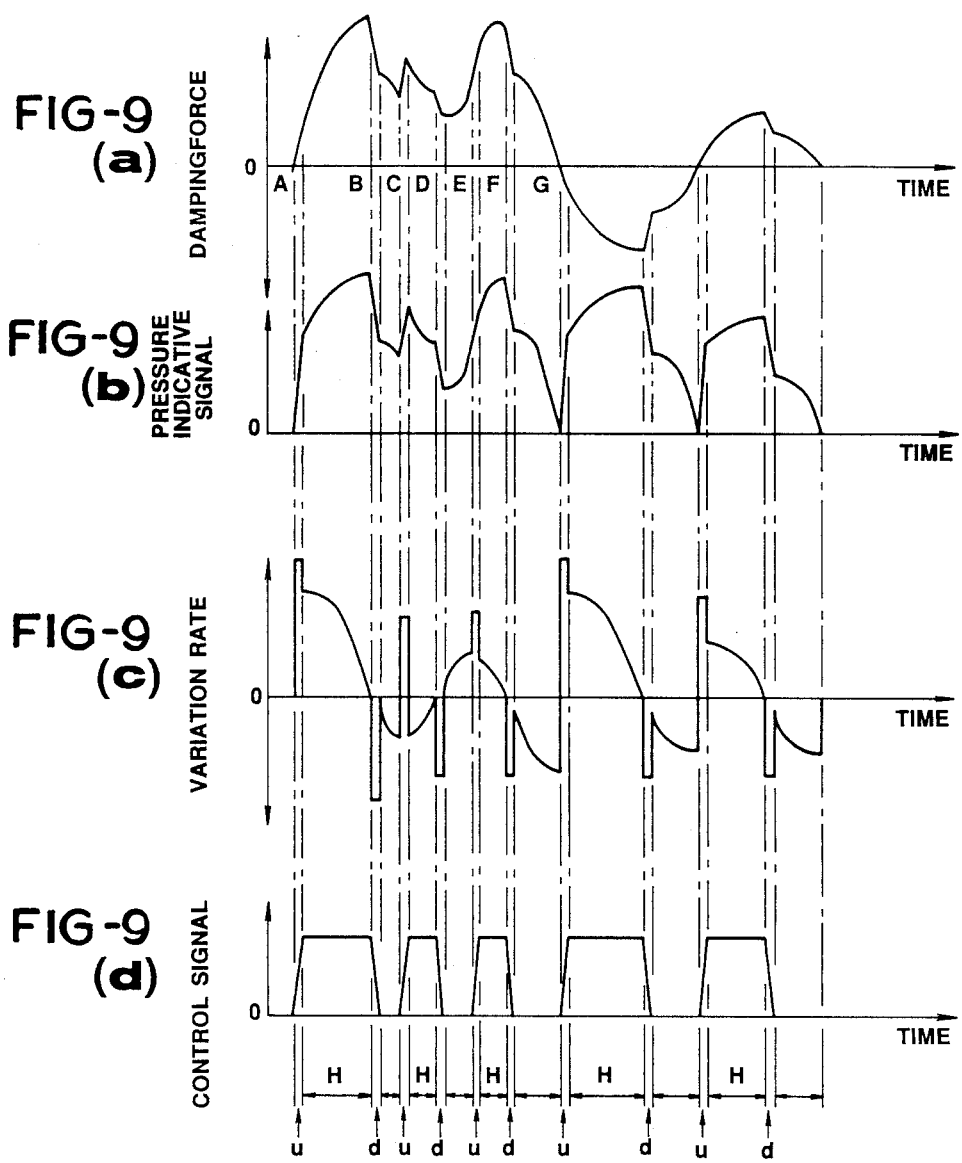
FIGS. 9(a–d) are timing charts showing a modified control operations performed in the preferred embodiment of the suspension system.

Though the shown operation FIG. 8, varies the control signal level to immediately switch the damping mode between HARD mode and SOFT mode rapidly, it may be possible to gradually vary the control signal level to provide predetermined gradients for the leading and trailing edges of the high level control signals as shown in FIG. 9. Such moderate change of the control signal level may provide a predetermined lag time for switching the damping mode between HARD and SOFT modes. This successfully avoids providing shock in the cylinder which may be otherwise caused by rapid change of the damping mode.

Figure 10:
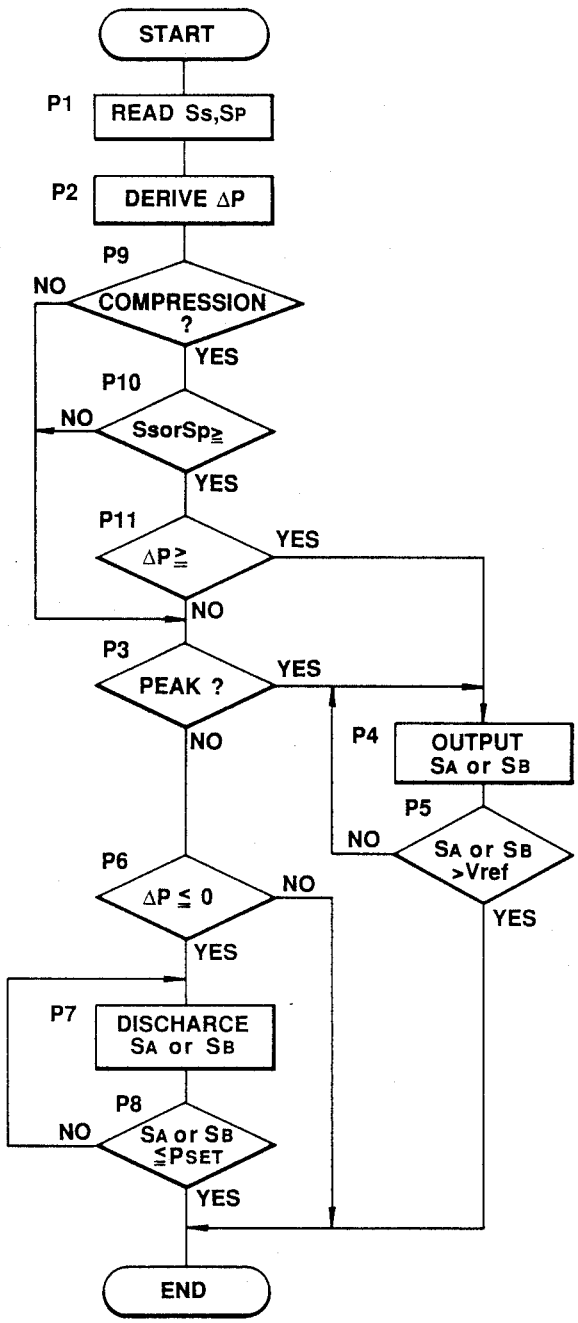
FIG. 10 is a flowchart showing a modified process of suspension control to be preferred embodiment of the suspension system.

FIG. 10 shows a modification of the damping mode control program to be executed by the arithmetic circuit. In the shown flowchart, the steps performing the identical operation to that discussed with respect to FIG. 7 will be represented by the same step number and neglected the detailed discussion in order to avoid redundant discussion which may cause confusion in understanding of the invention.

In the modified routine, a steps P9, P10 and P11 are inserted between the steps P2 and P3. Namely, after deriving the variation rate $\Delta P$ at the step P2, the piston stroke direction is checked whether the piston is in compression stroke at the step P9. If the answer at the step P9 is negative and thus indicative that the piston is in the expansion stroke, the process directly goes to the step P3. On the other hand, when the piston is in the compression stroke and thus the answer at the step P9 is positive, the compression mode pressure indicative signal Sp is compared with a given pressure threshold $P_{th}$ at the step P10. The pressure threshold $P_{th}$ is set at an experimentarily determined value with respect to respective type of the shock absorber, damping characteristics thereof, the type of the vehicle to which the shock absorber is applied and so forth. If the compression mode pressure indicative signal Sp is smaller than the pressure threshold $P_{th}$ as checked at the step P10, then process directly goes to the step P3. When the compression mode pressure indicative signal Sp is greater than or equal to the pressure threshold $P_{th}$, then the variation rate $\Delta P$ is compared with a predetermined bottoming criterion $Sp_{ref}$ at the step P11.

If the variation rate $\Delta P$ is greater than or equal to the bottoming criterion $Sp_{ref}$ as checked at the step P11, the process goes to the step P4. On the other hand, when the variation rate $\Delta P$ is smaller than the bottoming criterion $Sp_{ref}$, process goes to the step P3.

By inserting the steps P9, P10 and P11, bottoming suppressive damping mode control can be performed for switching damping mode from SOFT mode to HARD mode when the piston is in compression stroke; the fluid pressure in the lower fluid chamber is higher than a predetermined pressure level represented by the pressure threshold; and the variation rate is greater than or equal to the bottoming criterion which may be set at a smaller value than that of the predetermined value $P_{ref}$.

Figure 11:
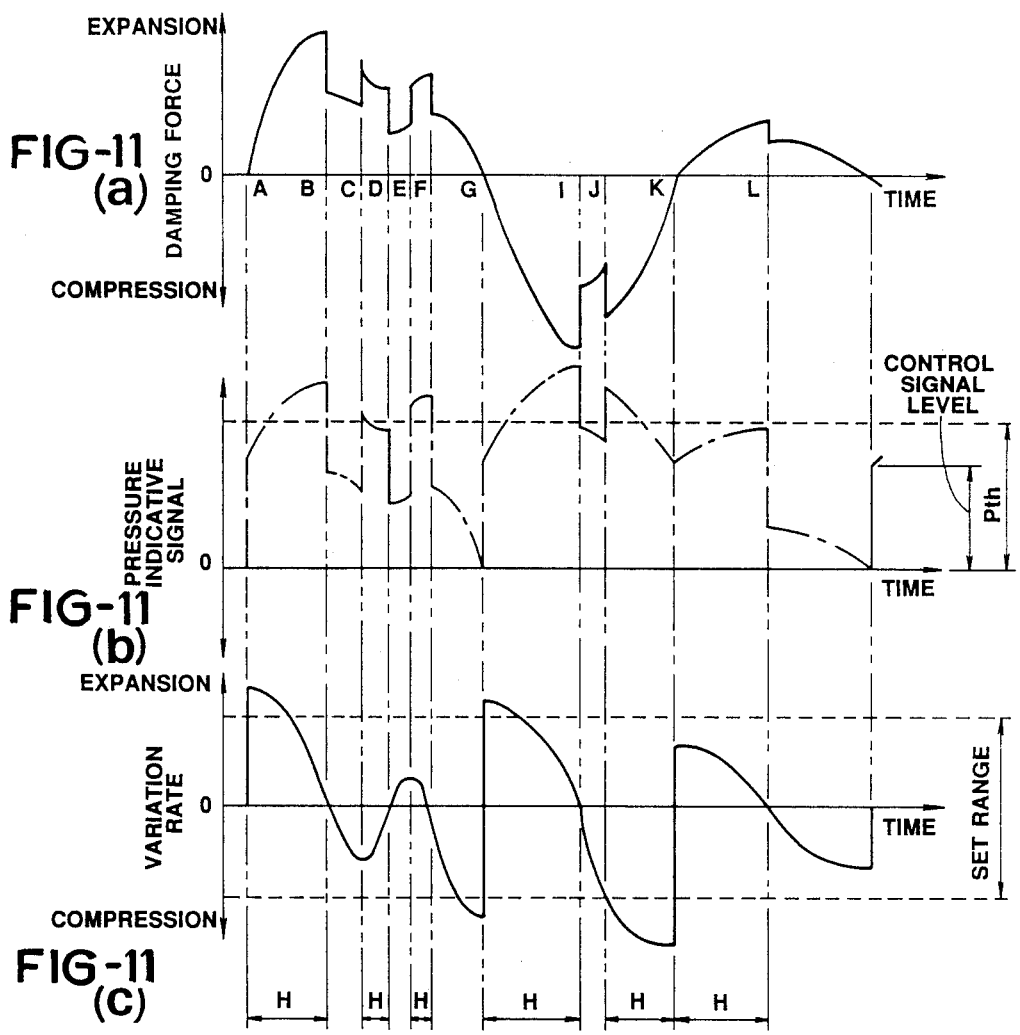
FIGS. 11(a–c) are timing charts showing control operations performed by the process shown in FIG. 10 in the preferred embodiment of the suspension system.

In the practical operation, as seen in the period between points G and I, J and K, and K and L of FIG. 11, the damping mode is switched into HARD mode for preventing the shock absorber from causing bottoming.

Figure 12:
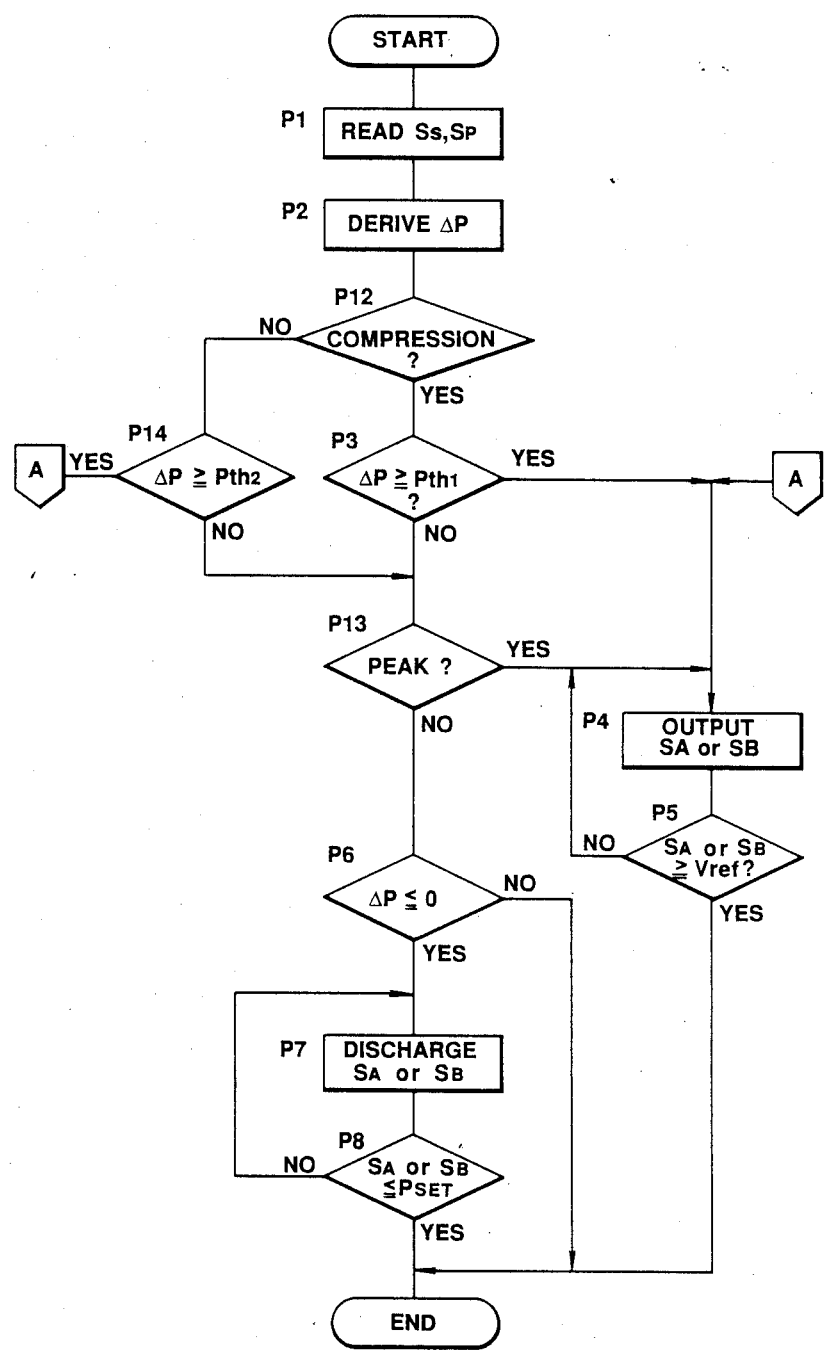
FIG. 12 is a flowchart showing another modification of process of suspension control to be preferred embodiment of the suspension system.

FIG. 12 shows a further modification of the suspension control program to be executed by the arithmetic circuit 120. In the shown modification, steps P12, P13 and P14 are inserted between the steps P2 and P3. Similarly to the foregoing modification of FIG. 10, the piston stroke direction is checked at the step P12. If the piston is in the compression stroke as checked at the step P12, the variation rate $\Delta P$ is checked with a first set value $P_{th1}$ at the step P13. If the variation rate $\Delta P$ is greater than or equal to the first set value $P_1$ as checked at the step P13, then process goes to the step P4 and otherwise goes to the step P3. On the other hand, when the piston is in the expansion stroke as checked at the step P12, the variation rate $\Delta P$ is checked with a second set value $P_{th2}$ at the step P14. If the variation rate $\Delta P$ is greater than or equal to the second set value $P_{th2}$ as checked at the step P14, the process goes to the step P4 and otherwise goes to the step P3.

Similarly to the foregoing modification, the first set value is set for detecting vibration magnitude possibility causing bottoming in compression stroke. On the other hand, the second set value is set for detecting vibration magnitude possibly causing bottoming in the expansion stroke. The practical value of the first set value may be determined through experiments.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. An automotive suspension system comprising:
a shock absorber disposed between a vehicle body and a suspension member rotatably supporting a road wheel, said shock absorber including a cylinder tube connected to one of said vehicle body and said suspension member and defining an internal space, a piston disposed within said internal space for dividing said internal space into first and second chambers and connected to the other of said vehicle body and said suspension member for relative movement with respect to said cylinder tube, said first and second chambers being filled with a working fluid;
a fluid communication means for establishing fluid communication between said first and second chambers with a limited fluid flow rate for generating a damping force against relative motion between said piston and said cylinder tube;
a valve means associated with said fluid communication means for controlling flow restriction of said fluid communication means, said valve means being variable of flow restriction characteristics for varying damping characteristics of said shock absorber;
a sensor means for monitoring fluid pressure in said first chamber for producing a piston stroke indicative signal indicative of magnitude of piston stroke;
an actuating means, associated with said valve means and responsive to a control signal, for controlling said valve means for adjusting flow restriction characteristics according said said control signal; and
a controlling means, receiving said piston stroke indicative signal, for deriving a piston stroke speed representative data on the basis of said piston stroke speed reaching a peak value for producing said control signal for harder damping characteristics and detecting alternation of piston stroke direction for producing said control signal for softer damping characteristics.

2. An automotive suspension system as set forth in claim 1, wherein said sensor means comprises a first piezoelectric element and said actuating means comprises a second piezoelectric element.

3. An automotive suspension system as set forth in claim 1, wherein said controlling means increases said control signal value at a predetermined rate for increasing flow restriction at a predetermined rate.

4. An automotive suspension system as set forth in claim 1, wherein said controlling means decreases said control signal value at a predetermined rate for decreasing flow restriction at a predetermined rate.

5. An automotive suspension system as set forth in claim 1, wherein said controlling means derives flow restriction to be represented by said control signal on the basis of a peak value of said variation rate of said pressure indicative signal.

6. An automotive suspension system as set forth in claim 1, said controlling means further compares said piston stroke speed with a predetermined bottoming criterion for increasing flow restriction when said variation rate is greater than or equal to said bottoming criterion.

7. An automotive suspension system comprising:
a shock absorber disposed between a vehicle body and a suspension member rotatably supporting a road wheel, said shock absorber including a cylinder tube connected to one of said vehicle body and said suspension member and defining an internal space, a piston disposed within said internal space for dividing said internal space into first and second chambers and connected to the other of said vehicle body and said suspension member for relative movement with respect to said cylinder tube, said first and second chambers being filled with a working fluid;
a fluid communication means for establishing fluid communication between said first and second chambers with a limited fluid flow rate for generating a damping force against relative motion between said piston and said cylinder tube;
a valve means associated with said fluid communication means for controlling flow restriction of said fluid communication means, said valve means being variable of flow restriction characteristics for varying damping characteristics of said shock absorber;
a pressure sensor means for monitoring fluid pressure in said fluid pressure in said first chamber for producing a pressure indicative signal indicative of magnitude fluid pressure level higher than a predetermined initial pressure level;
an actuating means, associated with said valve means and responsive to a control signal, for controlling said valve means for adjusting flow restriction characteristics according said said control signal; and
a controlling means, receiving said pressure indicative signal, for deriving a variation rate of said pressure indicative signal and detecting said variation rate reaching a peak value for producing said control signal for increasing flow restriction for harder damping characteristics and detecting said variation rate decreasing across a predetermined softer suspension criterion for producing said control signal for decreasing flow restriction for softer damping characteristics.

8. An automotive suspension system as set forth in claim 7, wherein said pressure comprises a first piezoelectric element and said actuating means comprising a second piezoelectric element.

9. An automotive suspension system as set forth in claim 8, wherein said controlling means increases said control signal value at a predetermined rate for increasing flow restriction at a predetermined rate.

10. An automotive suspension system as set forth in claim 7, wherein said controlling means decreases said control signal value at a predetermined rate for decreasing flow restriction at a predetermined rate.

11. An automotive suspension system as set forth in claim 7, wherein said controlling means derives flow restriction to be represented by said control signal on the basis of a peak value of said variation rate of said pressure indicative signal.

12. An automotive suspension system as set forth in claim 7, said controlling means further compares said variation rate with a predetermined bottoming criterion for increasing flow restriction when said variation rate is greater than or equal to said bottoming criterion.

13. An automotive suspension system comprising:
a shock absorber disposed between a vehicle body and a suspension member rotatably supporting a road wheel, said shock absorber including a cylinder tube connected to one of said vehicle body and said suspension member and defining an internal space, a piston disposed within said internal space for dividing said internal space into first and second chambers and connected to the other of said vehicle body and said suspension member for relative movement with respect to said cylinder tube, said first and second chambers being filled with a working fluid;
a fluid communication means for establishing fluid communication between said first and second chambers with a limited fluid flow rate for generating a damping force against relative motion between said piston and said cylinder tube;
a first valve means associated with said fluid communication means for controlling flow restriction of said fluid communication means in a first direction of piston stroke, said valve means being variable of flow restriction characteristics for varying damping characteristics of said shock absorber;
a second valve means associated with said fluid communication means for controlling flow restriction of said fluid communication means in a second direction of piston stroke opposite to said first piston stroke direction, said valve means being variable of flow restriction characteristics for varying damping characteristics of said shock absorber;
a first piezoelectric means for monitoring fluid pressure in said fluid pressure in said first chamber during said second direction of piston stroke and producing a first pressure indicative signal indicative of magnitude fluid pressure level, said first piezoelectric element being responsive to a control signal for adjusting said flow restriction during said first direction of piston stroke;
a second piezoelectric means for monitoring fluid pressure in said fluid pressure in said second chamber during said first direction of piston stroke and producing a second pressure indicative signal indicative of magnitude fluid pressure level, said second piezoelectric element being responsive to said control signal for adjusting said flow restriction during said second direction of piston stroke; and
a controlling means, receiving said first and second pressure indicative signal, for selecting one of said first and second pressure indicative signal depending upon the piston stroke direction for deriving a variation rate of the selected one of first and second pressure indicative signals, and detecting said variation rate reaching a peak value for producing said control signal for harder damping characteristics and detecting said variation rate decreasing across a predetermined second value for producing said control signal for softer damping characteristics.

14. An automotive suspension system as set forth in claim 13, wherein said controlling means has a first control channel connected to said first and second piezoelectric means for receiving said first pressure indicative signal from said first piezoelectric means and outputting said control signal to said second piezoelectric means during said first direction of piston stroke; and a second control channel connected to said first and second piezoelectric means for receiving said second pressure indicative signal from said second piezoelectric means and outputting said control signal to said first piezoelectric means in said second direction of piston stroke.

15. An automotive suspension system as set forth in claim 14, wherein said first piezoelectric means operates in a sensor mode during said second direction of piston stroke for monitoring fluid pressure in said first chamber and in an actuator mode for controlling said second valve means so as to adjust flow restriction during said first direction of piston stroke, and said second piezoelectric means operates in a sensor mode during said first direction of piston stroke for monitoring fluid pressure in said second chamber and in an actuator mode for controlling said second valve means so as to adjust flow restriction during said second direction of piston stroke.

16. An automotive suspension system as set forth in claim 15, wherein each of said first and second piezoelectric means comprises a plurality of thin plate members made of piezoelectric material and adapted to cause mechanical distortion in response to said control signal in a magnitude corresponding to the voltage of said control signal.

17. An automotive suspension system as set forth in claim 13, wherein said controlling means varies said control signal level between a first higher level ordering a predetermined harder damping characteristics and a second lower level ordering a predetermined softer damping characteristics.

18. An automotive suspension system as set forth in claim 17, wherein said controlling means varies said control signal level between said first higher and second lower levels at a predetermined variation rate for linearly varying damping characteristics between said predetermined harder and softer damping characteristics through a given lag period.

19. An automotive suspension system as set forth in claim 13, in which said piston strokes in said first direction in response to a vibration causing relative displacement of said vehicle body and said suspension member in bounding direction and in said second direction in response to a vibration causing relative displacement of said vehicle body and said suspension member in rebounding direction, and said controlling means detects the piston stroke in said first direction to compare said second pressure indicative signal with a predetermined pressure threshold and to compare said variation rate with a predetermined bottoming criterion for outputting said control signal for harder damping characteristics when said second pressure indicative signal is greater than or equal to said pressure threshold and said said variation rate is greater than or equal to said bottoming criterion.

20. An automotive suspension system as set forth in claim 13, in which said piston strokes in said first direction in response to a vibration causing relative displacement of said vehicle body and said suspension member in bounding direction and in said second direction in response to a vibration causing relative displacement of said vehicle body and said suspension member in rebounding direction, and said controlling means detects the piston stroke in said first direction to compare said variation rate with a predetermined first bottoming criterion for outputting said control signal for harder damping characteristics when said variation rate is greater than or equal to said first bottoming criterion, and detects the piston stroke in said second direction for to compare said variation rate with a predetermined second bottoming criterion for outputting said control signal for harder damping characteristics when said variation rate is greater than or equal to said second bottoming criterion.

21. An automotive suspension system as set forth in claim 16, wherein said controlling means varies the voltage level of said control signal corresponding to said peak value of said variation rate.

22. A variable damping force shock absorber system for an automotive suspension system, comprising:
a cylinder tube connected to one of a vehicle body and a suspension member rotatably supporting a road wheel and defining an internal space;
a piston disposed within said internal space for dividing said internal space into first and second chambers and connected to the other of said vehicle body and said suspension member for relative movement with respect to said cylinder tube, said first and second chambers being filled with a working fluid;
a fluid communication means for establishing fluid communication between said first and second chambers with a limited fluid flow rate for generating a damping force against relative motion between said piston and said cylinder tube;
a first valve means associated with said fluid communication means for controlling flow restriction of said fluid communication means in a first direction of piston stroke, said valve means being variable of flow restriction characteristics for varying damping characteristics of said shock absorber;
a second valve means associated with said fluid communication means for controlling flow restriction of said fluid communication means in a second direction of piston stroke opposite to said first piston stroke direction, said valve means being variable of flow restriction characteristics for varying damping characteristics of said shock absorber;
a first piezoelectric means for monitoring fluid pressure in said fluid pressure in said first chamber during said second direction of piston stroke and producing a first pressure indicative signal indicative of magnitude fluid pressure level, said first piezoelectric element being responsive to a control signal for adjusting said flow restriction during said first direction of piston stroke;
a second piezoelectric means for monitoring fluid pressure in said fluid pressure in said second chamber during said first direction of piston stroke and producing a second pressure indicative signal indicative of magnitude fluid pressure level, said second piezoelectric element being responsive to said control signal for adjusting said flow restriction during said second direction of piston stroke; and
said first and second piezoelectric means being connected to an externally provided controlling means, said controlling means receiving said first and second pressure indicative signal, for selecting one of said first and second pressure indicative signal depending upon the piston stroke direction for deriving a variation rate of the selected one of first and second pressure indicative signals, and detecting said variation rate reaching a peak value for producing said control signal for harder damping characteristics and detecting said variation rate decreasing across a predetermined second value for producing said control signal for softer damping characteristics.

23. A shock absorber system as set forth in claim 22, wherein said controlling means has a first control channel connected to said first and second piezoelectric means for receiving said first pressure indicative signal from said first piezoelectric means and outputting said control signal to said second piezoelectric means during said first direction of piston stroke; and a second control channel connected to said first and second piezoelectric means for receiving said second pressure indicative signal from said second piezoelectric means and outputting said control signal to said first piezoelectric means in said second direction of piston stroke.

24. A shock absorber system as set forth in claim 23, wherein said first piezoelectric means operates in a sensor mode during said second direction of piston stroke for monitoring fluid pressure in said first chamber and in an actuator mode for controlling said second valve means so as to adjust flow restriction during said first direction of piston stroke, and said second piezoelectric means operates in a sensor mode during said first direction of piston stroke for monitoring fluid pressure in said second chamber and in an actuator mode for controlling said second valve means so as to adjust flow restriction during said second direction of piston stroke.

25. A shock absorber system as set forth in claim 24, wherein each of said first and second piezoelectric means comprises a plurality of thin plate members made of piezoelectric material and adapted to cause mechanical distortion in response to said control signal in a magnitude corresponding to the voltage of said control signal.

26. A shock absorber system as set forth in claim 22, wherein said controlling means varies said control signal level between a first higher level ordering a predetermined harder damping characteristics and a second lower level ordering a predetermined softer damping characteristics.

27. A shock absorber system as set forth in claim 26, wherein said controlling means varies said control signal level between said first higher and second lower levels at a predetermined variation rate for linearly varying damping characteristics between said predetermined harder and softer damping characteristics through a given lag period.

28. A shock absorber system as set forth in claim 22, in which said piston strokes in said first direction in response to a vibration causing relative displacement of said vehicle body and said suspension member in bounding direction and in said second direction in response to a vibration causing relative displacement of said vehicle body and said suspension member in rebounding direction, and said controlling means detects the piston stroke in said first direction to compare said second pressure indicative signal with a predetermined pressure threshold and to compare said variation rate with a predetermined bottoming criterion for outputting said control signal for harder damping characteristics when said second pressure indicative signal is greater than or equal to said pressure threshold and said said variation rate is greater than or equal to said bottoming criterion.

29. A shock absorber system as set forth in claim 22, in which said piston strokes in said first direction in response to a vibration causing relative displacement of said vehicle body and said suspension member in bounding direction and in said second direction in response to a vibration causing relative displacement of said vehicle body and said suspension member in rebounding direction, and said controlling means detects the piston stroke in said first direction to compare said variation rate with a predetermined first bottoming criterion for outputting said control signal for harder damping characteristics when said variation rate is greater than or equal to said first bottoming criterion, and detects the piston stroke in said second direction for to compare said variation rate with a predetermined second bottoming criterion for outputting said control signal for harder damping characteristics when said variation rate is greater than or equal to said second bottoming criterion.

30. A shock absorber system as set forth in claim 25, wherein said controlling means varies the voltage level of said control signal corresponding to said peak value of said variation rate.

* * * * *

UNITED STATES PATENT AND TRADEMARK OFFICE
CERTIFICATE OF CORRECTION

PATENT NO. : 4,984,819
DATED : January 15, 1991
INVENTOR(S) : Shinobu Kakizaki, et al.

It is certified that error appears in the above-identified patent and that said Letters Patent is hereby corrected as shown below:

Column 19, line 58, after "stroke" insert
--indicative signal and detecting said piston stroke--.

Signed and Sealed this

Twenty-first Day of July, 1992

*Attest:*

DOUGLAS B. COMER

*Attesting Officer*  *Acting Commissioner of Patents and Trademarks*